(12) United States Patent
Moehler et al.

(10) Patent No.: US 10,229,142 B2
(45) Date of Patent: Mar. 12, 2019

(54) METHOD AND SYSTEM FOR HANDLING BINARY LARGE OBJECTS

(71) Applicant: International Business Machines Corporation, Armonk, NY (US)

(72) Inventors: Gregor Moehler, Stuttgart (DE); Torsten Steinbach, Holzgerlingen (DE); Knut Stolze, Hummelshain (DE); Mathias Trumpp, Ulm (DE)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 14/852,649

(22) Filed: Sep. 14, 2015

(65) Prior Publication Data

US 2017/0075937 A1  Mar. 16, 2017

(51) Int. Cl.
| G06F 17/30 | (2006.01) |
| G06F 3/06 | (2006.01) |
| G06F 11/14 | (2006.01) |
| G06F 12/02 | (2006.01) |
| G06F 12/10 | (2016.01) |

(52) U.S. Cl.
CPC ...... *G06F 17/30318* (2013.01); *G06F 3/0604* (2013.01); *G06F 3/064* (2013.01); *G06F 3/067* (2013.01); *G06F 3/0656* (2013.01); *G06F 3/0673* (2013.01); *G06F 11/1438* (2013.01); *G06F 17/30315* (2013.01); *G06F 17/30339* (2013.01); *G06F 17/30371* (2013.01); *G06F 17/30377* (2013.01); *G06F 17/30595* (2013.01); *G06F 12/0292* (2013.01); *G06F 12/10* (2013.01); *G06F 2201/80* (2013.01); *G06F 2201/805* (2013.01); *G06F 2201/82* (2013.01)

(58) Field of Classification Search
CPC ...................................................... G06F 3/064
See application file for complete search history.

(56) References Cited

U.S. PATENT DOCUMENTS

| 6,738,790 | B1* | 5/2004 | Klein ................. G06F 17/3061 |
| 2008/0114780 | A1 | 5/2008 | Man et al. |
| 2011/0099347 | A1* | 4/2011 | Plasek ................. G06F 9/5016 711/163 |

(Continued)

OTHER PUBLICATIONS

IBM: List of IBM Patents or Patent Applications Treated as Related (Appendix P), Oct. 25, 2016, 2 pages.

(Continued)

*Primary Examiner* — Hung Q Pham
(74) *Attorney, Agent, or Firm* — Michael A. Petrocelli

(57) ABSTRACT

A method includes storing data entities in data storage blocks, a logical structure of the storage of the data entities in the data storage blocks is a database including the data entities stored in tables, receiving a request message including an instruction to execute operations using data of the data entities being logically stored in one or more rows of the data entities in the table and physically stored in the data storage blocks of a processing set, determining that the data entity to be used for execution of the operations is stored across the data storage blocks, generating a processing subset in response to the determining that the data entity is stored across the data storage blocks, and executing the operations using a portion of the data stored in the processing subset.

18 Claims, 5 Drawing Sheets

(56) References Cited

U.S. PATENT DOCUMENTS

| | | | |
|---|---|---|---|
| 2012/0036150 A1* | 2/2012 | Richter | G01C 21/32 |
| | | | 707/769 |
| 2013/0054532 A1 | 2/2013 | Schreter | |
| 2013/0117247 A1 | 5/2013 | Schreter et al. | |
| 2014/0279961 A1 | 9/2014 | Schreter et al. | |
| 2014/0281212 A1 | 9/2014 | Schreter et al. | |
| 2015/0186043 A1* | 7/2015 | Kesselman | G06F 3/0614 |
| | | | 711/162 |

OTHER PUBLICATIONS

Pending U.S. Appl. No. 15/333,286, filed Oct. 25, 2016, entitled: "Method and System for Handling Binary Large Objects", 32 pages.

Barber et al., "Business Analytics in (a) Blink", Bulletin of the IEEE Computer Society Technical Committee on Data Engineering, 2012, pp. 1-6.

IBM, "DB2 Spatial Extender for Linux, UNIX and Windows", http://www-03.ibm.com/software/products/en/db2spaext, Printed on Apr. 29, 2015, pp. 1-2.

"dblp computer science bibliography", dblp: 16. BTW 2015: Hamburg, http://dblp.uni-trier.de/db/conf/btw/btw2015.html#StolzeRB15, Printed on Apr. 29, 2015, pp. 1-6.

Raman et al., "Constant-Time Query Processing", ICDE 2008, pp. 60-69.

Stolze et al., "Integration of Spatial Data in Database Acceleration for Analytics", IBM Germany Research & Development, Boblingen,IBM Silicon Valley Lab, San Jose, USA, pp. 1-12, 2015.

* cited by examiner

| | Column 100 | Column 101 | Column 102 |
|---|---|---|---|
| Row 110 | Value 211 (10 kB) | Value 212 (20 kB) | Value 213 (30 kB) |
| Row 111 | Value 221 (10 kB) | Value 222 (10 kB) | Value 223 (60 kB) |
| Row 112 | Value 231 (10 kB) | Value 232 (30 kB) | Value 233 (70 kB) |

METHOD AND SYSTEM FOR HANDLING BINARY LARGE OBJECTS

BACKGROUND

The present invention generally relates to binary large objects, and more particularly, to a method and a system for handling binary large objects.

Every year modern computer technologies show substantial progress in increasing of computing power of computer systems and capacity of data storage systems. Advances in these fields enable handling of ever increasing data volumes. Processing of "Big Data" becomes a service available to regular users. One of the aspects of processing of "Big Data" is handling of data entities being binary large objects (BLOBs). A BLOB is a collection of binary data stored as a single data entity. BLOBs typically contain image, audio, or other multimedia data. Navigation system vendors may also store map data in BLOBs. Processing of BLOBs is an actual data processing problem for computer systems of different scale. BLOBs may be processed not only on big computer systems like servers, super computers, and computer data processing centers but on small computer systems such as embedded systems including mobile telephones, personal digital assistants (PDAs), mp3 players, videogame consoles, digital cameras, DVD players, GPS receivers, navigation systems, printers, and so on.

SUMMARY

The present invention provides a method for processing data entities stored in data storage blocks of a storage device operated by a computing device, a system for performing the method, and a computer readable medium having stored thereon a computer executable code for execution by a computer processor controlling a computer system including a memory, where the execution of the instructions of the executable code causes the computer processor to execute the method.

One embodiment provides for a computer-implemented method for processing data entities stored in data storage blocks of a storage device operated by a computing device including a memory and a computer processor, the memory storing a processor-executable program code which when executed by the processor causes the computing device to execute the method. The method includes the following: storing data entities in the data storage blocks, where a logical structure of the storage of the data entities in the data storage blocks is a database including the data entities stored in tables, where the data entities having their data entity volumes exceeding a data storage volume of the data storage blocks are stored across the storage blocks, where columns of the data entities in the tables are stored in their respective column storage sets of the data storage blocks, receiving a request message including an instruction to execute an operation using data of the data entities being logically stored in one or more rows of the data entities in the table and physically stored in the data storage blocks of a processing set, determining that the data entity to be used for execution of said operation is stored across the data storage blocks, in response to the determining that said data entity is stored across the data storage blocks generating a processing subset including only some of the data storage blocks across which said data entity is stored, the processing set including the processing subset, and executing said operation using a portion of the data stored in the processing subset.

Another embodiment provides a system including a computing device, and a storage device including data storage blocks. The computing device includes a memory storing a processor-executable program code, and a computer processor to execute the processor-executable program code in order to cause the computing device to execute the following: storing data entities in the data storage blocks, where a logical structure of the storage of the data entities in the data storage blocks is a database including the data entities stored in tables, where the data entities having their data entity volumes exceeding a data storage volume of the data storage blocks are stored across the storage blocks, where columns of the data entities in the tables are stored in their respective column storage sets of the data storage blocks, receiving a request message including an instruction to execute an operation using data of the data entities being logically stored in one or more rows of the data entities in the table and physically stored in the data storage blocks of a processing set, determining that the data entity to be used for execution of said operation is stored across the data storage blocks, in response to the determining that said data entity is stored across the data storage blocks generating a processing subset including only some of the data storage blocks across which said data entity is stored, the processing set including the processing subset, and executing said operation using a portion of the data stored in the processing subset.

BRIEF DESCRIPTION OF THE DRAWINGS

Embodiments of the present invention are described in more detail in conjunction with the accompanying drawings in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figures 1, 2:
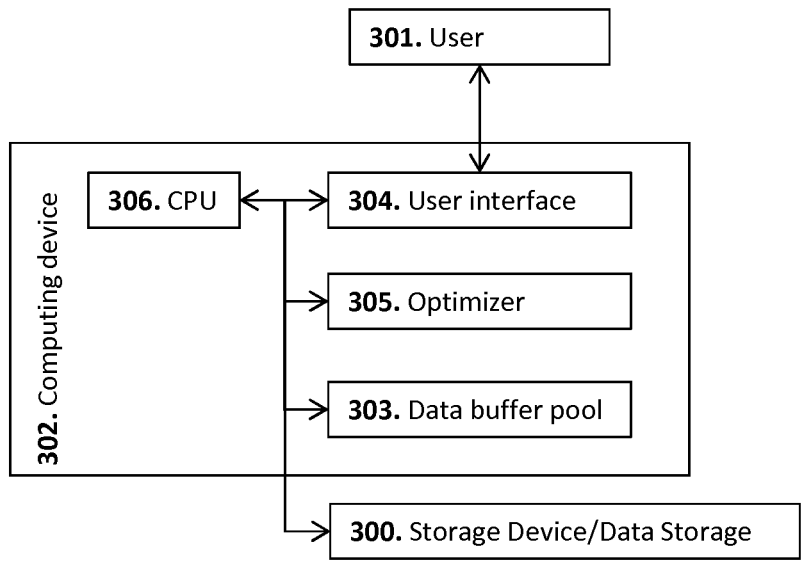
FIG. 1 illustrates an example computer system, according to an embodiment of the present disclosure.
FIG. 2 illustrates an example table, according to an embodiment of the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Almost any data storage system employs data storage blocks for storing data. For instance this may be memory pages or clusters of the hard disk drive. As usual a fixed data volume is chosen for all data storage blocks in one storage system. This approach works well when data entities having similar data volumes are stored on the storage device. The fixed data volume of the data storage blocks may be selected in a way that enables efficient utilization of the storage space of the storage device and provides short access time.

For instance, when the distribution of data volumes of the data entities is narrow it might be possible to select the fixed data volume of the data storage blocks in a way that allows storing the vast majority of the data entities in their respective single data storage blocks and keep the overhead of wasted storage space low. This solution may no longer be effective when binary large objects (BLOBs) are stored together with other data entities having regular data volumes substantially smaller than the data volumes of BLOBs. Selecting the fixed data volume of the data storage blocks being optimized for storing BLOBs may inevitably result in storing large amounts of the regular data entities in single data storage blocks or in substantial waste of the data storage space.

An alternative solution may include when the fixed data volume of the data storage blocks is optimized for storage of the regular data entities, results in a data configuration when BLOBs are stored across several data storage blocks. Direct integration of this data configuration with established data storage solutions like (relational) databases may be problematic, because the (relational) databases employ column storage and/or row storage for physical allocation of the data entities in the memory space of the storage device and table allocation of the data entities in the logical structure of the relational database. Row and especially column data storage enable effective utilization of the memory space and fast processing of data entities.

For instance data entities of one column have as usual the same type, as a consequence, they may be effectively compressed and/or processed using the same operation (e.g. statistical operation of calculation of average). On the other hand when row storage is employed addressing of a single data in a row of a table may require processing/addressing of all data entities stored in the row. This would not be a problem when no BLOBs are stored in the row. In this case a data volume of the row may remain relatively small. When the row includes one or more BLOBs and execution of an operation on a single data entity in the row requires processing of all BLOBs in the row. As a result thereof a redundant processing overhead of execution of the operation may be too large.

Therefore, embodiments of the present disclosure may address the aforementioned problem by taking advantage of a synergistic effect between storing the data entities having their data volumes exceeding the fixed data volume of the data storage blocks across the data storage blocks and executing operations which execution may be completed by using data entity fragments discretely stored in the data storage blocks. For instance, a data entity fragment stored in a single data storage block may be used for execution of an operation instead of the complete data entity including the data entity fragment and being stored across the data storage blocks. Implementation of this approach may require special storage format of the data entities for their storage across the data storage blocks.

Embodiments of the present disclosure may be described by a system, a method, and/or a computer program product. The computer program product may include a computer readable storage medium (or media) having computer readable program instructions thereon for causing a processor to carry out aspects of the present invention.

The proposed method of data processing may be implemented using an example system depicted in FIG. 1. The system may include a computing device 302 and a storage device (data storage) 300 including data storage blocks. The storage device 300 may be a separate storage device or a storage device integrated in the computing device 302, e.g. a hard disk (solid state) drive of an embedded system. The computing device 302 may include a memory storing a processor-executable program code and a computer processor unit (CPU) 306. The CPU 306 executing the processor-executable program code may cause the computing device 302 to store data entities (e.g. data entities 211-213, 221-223, 231-233 in FIGS. 2-4) in data storage blocks. The data storage blocks may be for instance memory pages (e.g. Pages 1-9 in FIG. 3 and Pages 1-10 in FIG. 4). A logical structure of the storage of the data entities in the data storage blocks is a database including the data entities stored in tables (e.g. a table depicted in FIG. 2). It should be noted that, in this embodiment, the data storage blocks may also be referred to as "data storage pages" or "pages".

Figure 4:
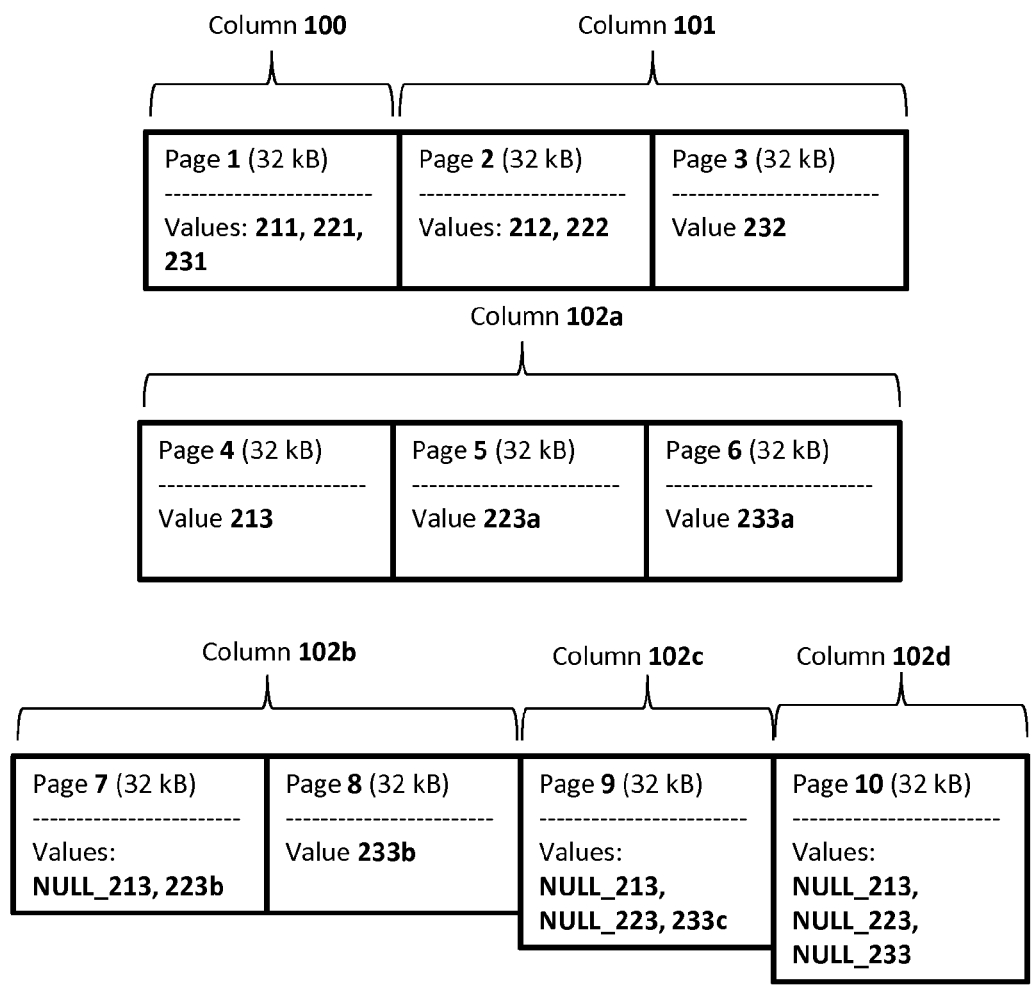
FIG. 4 illustrates an example of storage of data entities in data storage blocks, according to an embodiment of the present disclosure.
Figure 5A:
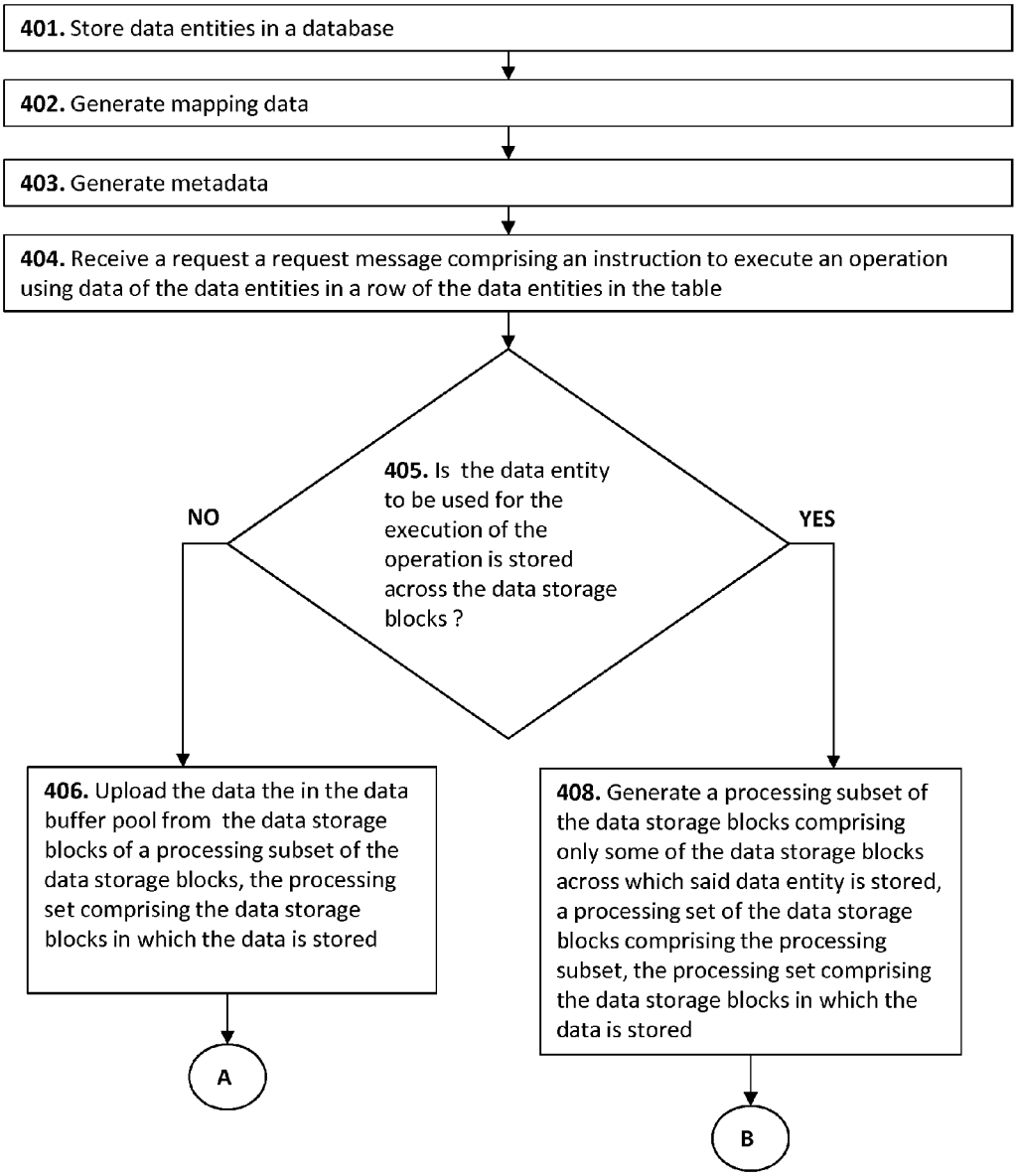
FIGS. 5a and 5b illustrate a flow diagram of a method, according to an embodiment of the present disclosure.
Figure 5B:
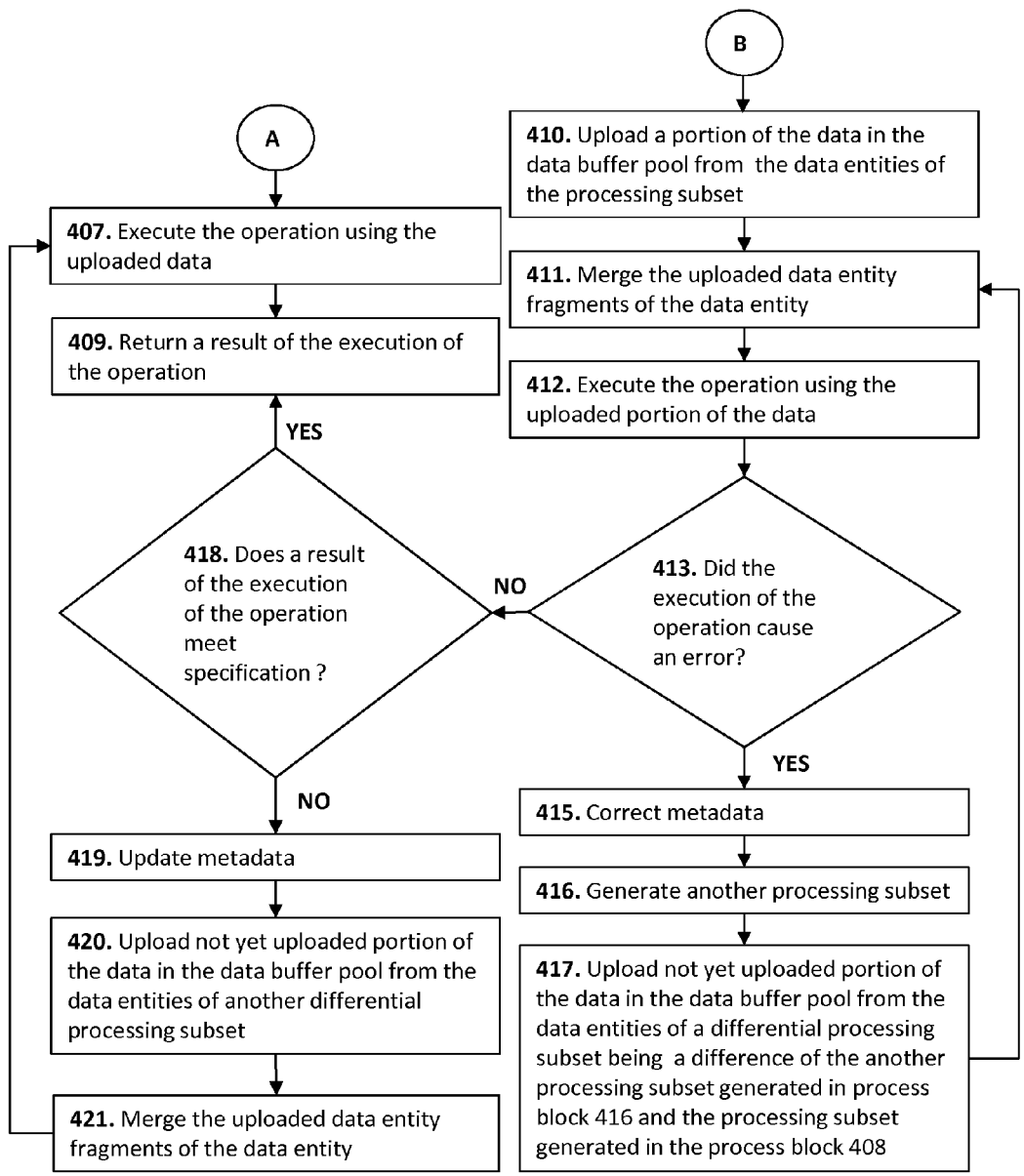

This process is represented by a process block 401 of a flow chart diagram of a method depicted in FIGS. 5*a* and 5*b*. The database may be a relational database. The data entities having their data entity volumes exceeding a data storage volume of the data storage blocks are stored across the storage blocks. In contrast, the data entities having their data entity volumes being equal to or less than the data storage volume are not stored across the data storage blocks. They may be discretely stored in the single data storage blocks. In addition, the data entities of one column (being allocated next to each other in said column) having overall data volume being less than or equal to the data storage volume may be stored in one data storage block. For instance, data entities 211, 221, 231 having overall data volume less than the data storage volume of 32 kB are stored in one data storage block (page) 1. Although in this case the data storage block 1 is not completely filled. No data entity fragments of any other data entities are stored in the data storage block (page) 1 in order to avoid unnecessary storing of the data entities across the data storage blocks. The data entities (values) 212, 222, and 232 are stored in the data storage blocks (pages) 2 and 3 in a similar way. The data entities 222 and 212 are stored in the data storage block 2, because their overall data volume is 30 kB, which is less than the data storage volume of the data storage block 2. The data entity volume of the data entity (value) 232 may be too big to be completely stored in the data storage block 2 together with the data entities 212 and 222, thus it is stored in a separate data storage block (page) 3. The data entity 223 having data entity volume of 60 kB being bigger than the data storage volume of pages 1-10 (32 kB) may be stored across pages 5 and 6 in FIG. 3 and across pages 5, 8, and 9 in FIG. 4. The data entity 233 having data entity volume of 70 kB is stored across pages 7-9 in FIG. 3 and across pages 6, 8-10 in FIG. 4. Columns of the data entities in the tables are stored in their respective column storage sets of the data storage blocks. The data storage blocks may be memory pages, e.g. memory pages of the memory stored in the storage device 300.

Figure 3:
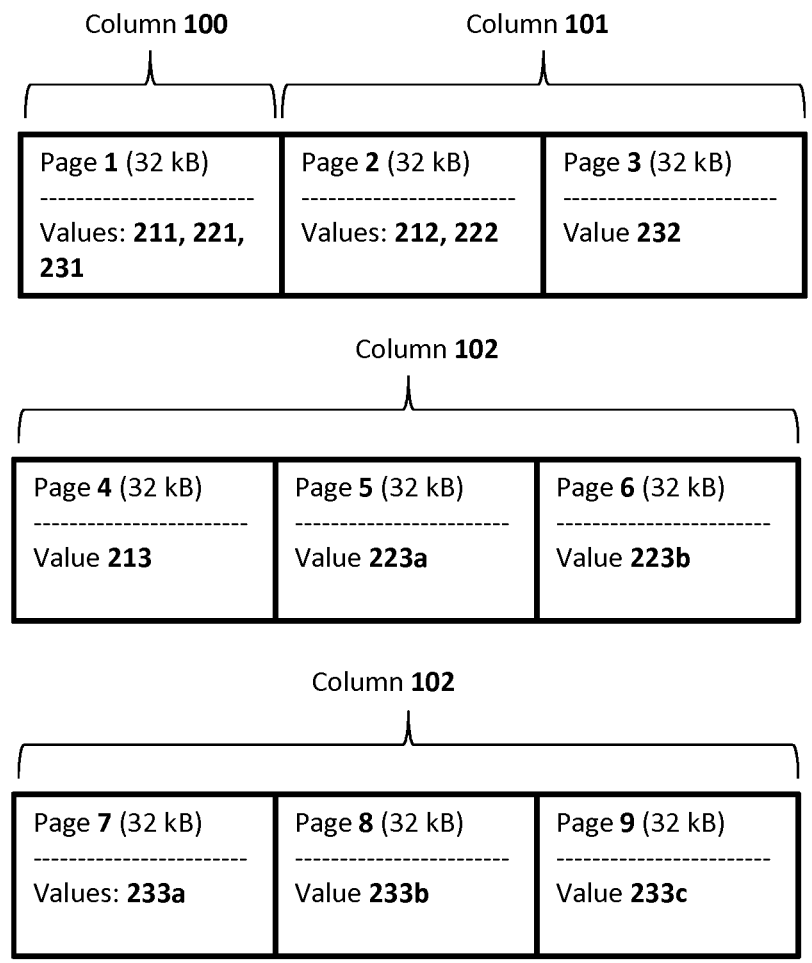
FIG. 3 illustrates an example of storage of data entities in data storage blocks, according to an embodiment of the present disclosure.

Grouping of data storage blocks storing of data entities of the same columns may be advantageous when the database is a column-store database, because table columns in the database have their respective column storage sets of the data storage blocks. FIGS. 3 and 4 illustrate two different example approaches for allocating column storage sets.

The approach depicted in FIG. 3 may be based on the following rules, which are formulated for data entities of a single column for the sake of clearness. Those skilled in the art will understand that these rules may be applied for storage of data entities of any column of any table in the database. Each column 100-102 has its corresponding column storage set of the data storage blocks (pages) 1, 2 and 3, 4-9. Data entities of the same row having overall data volume less or equal to the data storage volume are stored in one data storage block (e.g. values 211, 221, and 231 stored on Page 1; values 212 and 222 stored on page 2). Data entities having their data entity volumes bigger than the data storage volume may be stored across data storage blocks included in the respective column storage sets. The data entity (value) 223 is split into two data entity fragments (values) 223a and 223b being stored in data storage blocks (pages) 5 and 6. The data entity (value) 233 is split into three data entity fragments (values) 233a, 233b, and 233c being stored in data storage blocks (pages) 7-9. The data storage blocks of (each of) the column storage set(s) may be contiguously allocated in a memory space of the storage device 300.

The approach depicted in FIG. 4 is based on the following rules, which are formulated for data entities of a single column for the sake of clearness. Those skilled in the art will understand that these rules may be applied for storage of data entities of any column of any table in the database. Data entities of the same row having overall data volume less or equal to the data storage volume are stored in one data storage block (e.g. Pages 1 and 2 on FIG. 4). Data entities having their data entity volumes bigger than the data storage volume may be stored across data storage blocks included in different column storage subsets of the column storage set. The column storage set is split in the column storage subsets. It is of particular advantage to generate at least one column storage subset including data entity fragments of all data entities of the respective row. It should be noted, that if the data entity has its data entity volume less or equal to the data storage volume then it is completely stored in the data storage block of this column storage subset. As it will be discussed further on, this column storage subset might contain sufficient data for execution of an operation on any of the data entities stored in said row.

Other column storage subsets may be generated according to the same principle as the column storage subset including data entity fragments of all data entities. Every next generated column storage subset has to include data storage blocks sorting data entity fragments of all data entities, which are not yet completely stored in the previously generated column storage subsets. The data storage blocks of (each of) the column storage subset(s) may be contiguously allocated in the memory space of the storage device 300. The data storage blocks of (each of) the column storage set(s) may be as well contiguously allocated in the memory space of the storage device 300.

Example configurations of data storage blocks in column storage subsets, which is generated according to the process described above is depicted on FIG. 4. A column storage set of the column 102 including pages 4-10 is split in 4 column storage subsets: column 102a (pages 4-6), column 102b (pages 7 and 8), column 102c (page 9), column 102d (page 10). Data entity fragments of all data entities 213, 223, and 233 of the row column 102 may be stored in the column storage subset 102a. Data entity 213 is stored on page 4 of the column storage subset 102a. Data entity fragment 223a of the data entity 223 is stored on page 5 of the column storage subset 102a. Data entity fragment 233a of the data entity 233 is stored on page 6 of the column storage subset 102a. The next column storage subset 102b includes pages 7 and 8. An auxiliary data structure NULL_213 of the data entity 213 and another data entity fragment 223b of the data entity 223 are stored on page 7. Another data entity fragment 233b of the data entity 233 is stored on page 8. The auxiliary structure NULL_213 indicates that no data entity fragments of the data entity 212 are stored on page 7. On the other hand it may enable repeating data structure of the column storage of the column storage subset 102a. Both column storage subsets 102a and 102b may include data of the same data entities values 213, 223a, 233a and NULL_213, values 223b, 233b. Further column storage subsets 102c and 102d are built in a similar way. Yet another data entity fragment 233c of the data entity 233, an auxiliary data structure NULL_213 of the data entity 213, and an auxiliary data structure NULL_223 of the data entity 223 are stored on page 9. Auxiliary data structures NULL_213, NULL_223, and NULL_233, are stored on the page 10.

Utilization of the aforementioned auxiliary structures in conjunction with contiguous allocation of data storage blocks in the memory space of the data storage device 300 may simplify access to data stored in the column. It is necessary to provide a pointer to the first data storage block of the contiguously allocated data storage blocks storing data entities of the column. Periodical storage of data based on sequential repetition of the same amounts of fragments and/or auxiliary structures of the data entities makes it possible to "navigate" in the data storage blocks of the column storage set just by reading them.

With independent of particular storage of the data entities in the data storage blocks of the column storage sets, allocation of contiguously allocated data storage blocks for the (each of the) column storage (sub)sets may be advantageous, because it accelerates and simplifies data retrieval. Another advantageous measure facilitating the same improvements may be storing of the data entities in the contiguously allocated data storage blocks in the same sequence as they are allocated in the columns of the tables. When the row includes one more data entities being stored across the data storage blocks and the respective storage (sub)set includes more than one data storage block in which data entity fragments of the same data entity are stored, than mapping data has to be generated for said respective storage (sub)set. The mapping data links logical allocation of the data entities in the row with their physical allocation in the contiguously allocated data storage blocks. The mapping may further enable effective utilization of the data storage space by optimizing allocation of the data entities in the data storage blocks. For instance, in a case when data entities (values) 211, 221, 231 of the column 100 have respective data entity volumes of 10 kB, 30 kB, 10 kB, then without mapping they would be stored each in a separate data storage block having data storage volume of 32 kB in order to preserve the same sequence of storage in the stable and in a sequence of contiguously allocated data storage blocks. When mapping is used than the first and the third data entities 211, 231 may be stored in one data storage block and the data entity 221 may be stored in another data storage block.

Those skilled in the art will clearly see that the approaches for data entity storage depicted in FIGS. 3 and 4 are not the only one suitable options for implementing the invention. For instance, it is possible to use a hybrid solution, where two data storage blocks contained in a column storage subset are used for storage of data entity fragments of the data entity. In this case, the page 8 is included in the subset 102*a* instead of the subset 102*b*.

Contiguous allocation of the data storage blocks of the column storage (sub)sets may be an advantage, but on the other hand it is not a premise of the present invention. When the data storage blocks of the column storage (sub)sets are allocated in a discontinuous way in the physical memory space of the storage device 300, mapping data linking logical addresses of the data entities in the tables to the respective physical addresses in the physical memory space of the data storage blocks in which the data entities are stored may be used. This mapping may facilitate as well more compact storage of the data entities in the data storage blocks.

Those skilled in the art will clearly understand that the contiguous allocation of data storage blocks and mapping are measures being complimentary to each other. Storing of the data entities in the contiguously allocated data storage blocks while keeping sequence of allocation of the data entities in the rows might require more data storage blocks, less mapping data, and provide shorter access time in comparison with storing of the data entities in a way enabling minimization of a number of the data storage blocks used for the storage of the data entities. In the latter case the data entities may be physically stored in the data storage blocks which physical allocation in the memory space of the storage device 300 lacks order or even completely random, as a result thereof mapping of substantial amount (or even all) of the data entities is required.

Processor executing the processor-executable program code may further cause the computing device 302 to generate any of the aforementioned mapping data. The mapping data may be stored in the storage device 300. This process is represented by a process block 402, which is executed after the process block 401.

Data entities stored in the data storage blocks may be compressed. The data compression may be performed for each of (some of) the data storage blocks data independently from the other data storage blocks. Alternatively or in addition, the data compression may be performed for data stored in sets of contiguously allocated data storage blocks.

Processor executing the processor-executable program code may further cause the computing device 302 to receive a request message including an instruction to execute an operation using data of the data entities which are logically stored in one or more rows of the data entities in the table and physically stored in the data storage blocks of a processing set. This process may be represented by the process block 404 being executed after the process block 403, in which metadata is generated. The process block 403 is described further in the text.

The processing set may include only the data storage blocks in which the data entities required for execution of the operation are stored. The request messages may be received form a user 301 via a user interface 304 of the computing device 302. The request messages may be received by the computing device 302 via network from other computer system. The request message may include a specification of the result of execution of the operation to be achieved. The specification of the result may be for instance an error margin for the result to be achieved. Error margin may be very important for processing of geospatial data, because it may determine resolution of the geospatial data to be processed in order to achieve specified error margin of the result.

Various operation parameters of the operations may be specified in the request messages. Since BLOBs are used in various fields like audio, video, geospatial data, etc. the list of various descriptions of operations is big. For instance, operation parameter of an operation to be executed on a data entity being audio or video recording may be specification of a time interval of the recording in which the operation has to be executed, e.g. making a copy of a fragment of the recording starting from the 7th minute of the recording and ending on the 10th minute of the recording. Alternatively an operation parameter (e.g. audio spectrum) may be associated with entire record, e.g. selecting audio recordings having frequency spectrum in the range of 20-1000 Hz. Operation related to processing of geospatial data may be, for instance, identifying whether polygons (geometries) stored in the data base overlap with the polygon (geometry) specified by user 301. In this case a polygon specified by the user 301 is an operation parameter. Another simple geospatial operation is determining how many countries in our planet have their territories intersected by the equator. This case coordinates of the equator are operation parameter. When operation includes a standard query language (SQL) query, one or more predicates of the SQL query may be operation parameter.

These examples of the operation parameters may indicate that it is possible to determine upfront on a basis of operation parameters whether entire data entity (e. g. BLOB) stored across the data storage blocks is required for execution of the operation. For instance, when there is a need to make a copy of the aforementioned recording and it is known that the first 15 minutes of the audio recording are stored in a particular data storage block, there is no need to process other data storage blocks in which the rest of the audio recording is stored. In contrast, when the operation of selection of the audio recordings having specified spectrum is executed, it is clear upfront that entire audio recordings (i.e. all data storage blocks of the audio recordings) have to be processed.

In order to facilitate selective processing of data entity fragments stored in different data storage blocks data structure of the data entities may be adapted accordingly. For instance, when intersection of polygons has to be determined, it makes sense to verify first whether their bounding boxes overlap. In the case of determination that the bounding boxes do not overlap then there is no need to process geometries of polygons, because the result obtained for the bounding boxes is already sufficient. If it is determined that the bounding boxes overlap, then processing of polygons is required in order to determine whether the polygons overlap. This approach based on preprocessing of the bounding boxes may save a lot of resources because polygons in geospatial data applications may have millions of apices in contrast to few apices of the bounding boxes. Thus adding bounding box of a polygon to one of the data storage blocks across which the polygon data is stored may reduce volume of data to be processed. Only one data storage block including bounding box of the polygon has to be used for preprocessing of the bounding boxes as described above.

Another example of adaptation of data structure of the data entities stored across the data storage blocks is storing coordinates of specific apices of a polygon in one of the data storage blocks and storing coordinates of other apices of the polygon in the other data storage blocks. For instance, executing of the operation of determination of the number of countries, which territories are intersected by the equator may require processing only of one data storage block of a set of the data storage blocks including geometry of the state border, if is known upfront that there is a specific data storage block in each of the sets which includes representative coordinates of the state borders enabling to determine whether the state territory is intersected by the equator. A simple solution would be to store in a first data storage block of the set of the data storage blocks a fragment of a state border (i.e., coordinates of apices of a fragment of the polygon describing the state border) intersected by equator for countries which territory is intersected by the equator. In this case calculating of the number of countries, which territory is intersected by the equator, is limited to calculation of a number of the first data storage blocks including coordinates in the north and south hemisphere of our planet.

The coordinates of the state borders may be stored across the data storage blocks in a more intelligent way. Suppose that 3 data storage blocks are needed for storing coordinates of apices of a polygon of a state which territory is intersected by the equator. The state border having low resolution may be stored in the first data storage block, first additional data may be stored in the second data storage block, and the third additional data may be stored in the third data storage block. When the data of the first and the second data storage blocks are merged, the state border with medium resolution is obtained. When the data of all data storage blocks are merged, the state border with high resolution is obtained.

The latter example is a good illustration of utilization of the specification of the result to be achieved. The operation may be a calculation of intersection length of equator on a territory of an equatorial state with specified error margin. First only a low resolution of the state border stored in the first data storage block is used for calculation of the intersection length its error margin. If the calculated error margin is bigger than the specified error margin, the next calculation is performed using data stored either in the first and the second data storage blocks or in all data storage blocks.

The execution of the processor-executable program code by the processor may further cause the computing device 302 to generate metadata linking the operation parameters of the operations and the data storage blocks in which data entity fragments of the data entities to be used for the execution of the operations are stored. This process is represented by the process block 403, which is executed after the process block 402. The metadata indicates which data entity fragment of the data entity instead of the entire data entity might be or is sufficient for execution of a specific operation. The metadata may be generated after the generation of the database on a basis of the knowledge related to operations and intervals in which their operation parameters may be varied. The metadata may be corrected during or after execution of the operation in a case of error or when the obtained result does not meet the specification. The metadata may be stored in the memory. The aforementioned examples clearly illustrate that the data entities (e.g. data entities including spatial data) having their data entity volumes exceeding the data storage volume may be stored across the data storage blocks in a way enabling generation of the metadata.

The execution of the processor-executable program code by the processor may further cause the computing device 302 to check whether at least one of the data entity to be used for execution of the operation is stored across the data storage blocks. Determining that the data entity to be used for execution of said operation is stored across the data storage blocks may be based on the mapping data indicating that the logical address of said data entity is mapped to more than one physical addresses of the data storage blocks. Alternatively or in addition this may be done by execution of a prefetching operation which may count a number of the data storage blocks used for storage of said data entity or determine that the data entity volume is bigger than the data storage volume of the data storage block. This process is represented by a decision process block 405, which is executed after the process block 404.

In response to determining that the data entity to be used for execution of the operation is stored across the data storage blocks, the execution of the processor-executable program code by the processor may further cause the computing device 302 to generate a processing subset including only some of the data storage blocks across which said data entity is stored. The processing set includes the processing subset. The generating of said processing subset may include selecting the data storage blocks into said processing subset according to the metadata. The metadata may link one or more operation parameters of the operation and data entity fragments of said data entity to be contained in the data storage blocks of the processing subset. Alternatively or in addition, the metadata may link one or more operation parameters of the operation with the respective processing subset needed for execution of the operation. This process is represented by the process block 408, which execution is caused by the decision block 405 in response to determining that the data entity to be used for execution of the operation is stored across the data storage blocks. When this is not the case the de decision process block 405 causes execution of the process block 406.

The execution of the processor-executable program code by the processor may further cause the computing device 302 to execute the operation using a portion of the data stored in the processing subset. Performance of some storage devices 300 and/or computing devices 302 may optimized, when columns of the data entities are processed simultaneously. Alternatively or in addition execution of the operation may require processing of all or majority of data entities in the column of the table. In this case, the processing subset may be the column storage subset including data entity fragments of all data entities of the column including the data entity stored across the data storage block. This process is represented by the process block 412, which may be executed after the process block 408 or after one of the optional process blocks 410 and 411.

In response to determining that a result of the executing of the operation using the portion of the data stored in the processing subset does not meet a specification 418, the execution of the processor-executable program code by the processor may further cause the computing device 302 to execute said operation using the data stored in the processing set including the processing subset. This process is depicted by the process block 407. Execution of the process block 407 is caused by the decision process block 418 when it is determined that the result of the executing of said operation using the portion of the data stored in the processing subset does not meet a specification, otherwise the decision process block causes execution of the process block 409. The decision process block 418 may trigger execution of one or more optional process blocks 419-421, which are described further in the text. The decision process block 418 may be executed after the process block 412 or after an optional loop of error correction triggered by a decision process block 413, which is described further in the text.

The computing device 302 may further include a data buffer pool 303. The data buffer pool 303 may be allocated in the memory of the computer system. Alternatively it may be implemented as a separate hardware unit of the computing device 302. The data buffer pool 303 is used for storing data entities and their fragments which are used for execution of the operations. It may be further used for merging data entity fragments, performing data decompression of compressed data entities and their data entity fragments.

The execution of the processor-executable program code by the processor may further cause the computing device 302 to execute the following before the executing of the operation using the portion of the data stored in said processing subset: uploading in the data buffer pool 303 the portion of the data stored in said processing subset and merging uploaded data entity fragments of said data entity, if the uploaded portion of the data includes more than one fragments of the same data entity. The portion of the data used for the executing of the operation is the uploaded portion of the data. This process is depicted by the process block 410, which is executed after the process block 408.

The uploading of the portion of the data may include at least one of the following: uploading of one or more data entities, uploading of one or more data entity fragments, uploading of one or more memory pages, uploading of one or more contiguously allocated memory pages, uploading of a column storage subset of the data entities. The uploading of the portion of the data may further include data decompression of any of the aforementioned entities. Merging of the data entity fragments may result in generation of another data entity fragment or in generation of a complete data entity being the same as the original data entity. This process is depicted by the process block 411, which is executed after the process block 410.

In response to the determining that the result of the executing of said operation using the portion of the data stored in said processing subset does not meet the specification (decision process block 418), the execution of the processor-executable program code by the processor may further cause the computing device 302 to execute the following before the executing of said operation using the data stored in said processing set (process block 407): uploading in the data buffer pool 303 a not yet uploaded portion of the data stored in a difference subset (process block 420), completing merging of uploaded data entity fragments of the data entity (process block 421), and as option updating the metadata (process block 419). The processing set is split in said processing subset and the difference subset. The data used for the execution of the operation using the data stored in the processing set is the uploaded data. After the completing merging of the uploaded data entity fragments all data entities of the processing set, which are stored across the data storage blocks are completely merged in the data buffer pool 303 and identical to the original ones.

The updating of the metadata may be performed in order to generate next time a result complying with the specification straight the way without the need to upload additional information to the data buffer pool 303 and repeat the execution of the operation using bigger volume of data. The metadata may be updated in a way such that a new portion of the data stored in a new processing subset, which is generated using the updated metadata, is the bigger portion of data in comparison with the previously used portion of the data. The practical implementation of this approach may be readily understood on the basis of the aforementioned example related to storing of the border line data across 3 data storage blocks. For instance, the previously used portion of the data may be stored in the single data storage block, while the new portion of the data may be stored in two data storage blocks.

The updating of metadata may be performed after collecting statistics based on execution of the operations on the data entities. Statistics may be collected for different types of operations and/or for different types of data. For instance, if statistics shows that execution of the operation on the data entities in a column of one of the tables (e.g. BLOBs stored each across the data storage blocks) requires in majority of cases (e.g. more than 75%) processing of entire data entities then the metadata may be changed in a way that the respective processing subsets include more data storage blocks each. In an another example, if statistics shows that execution of the operation on the data entities in a column of one of the tables (e.g. BLOBs stored each across the data storage blocks) requires only in a few cases (e.g. less than 25%) processing of entire data entities then the metadata may be kept unchanged.

Those skilled in the art will readily understand that the optional process block 419 may be executed at any time before execution of the same operation is stated. On contrary execution of another optional process blocks 420 and 421 may not be delayed. They have to be executed before the execution of the process block 407.

In response to determining a failure of the executing of the operation using the portion of the data stored in the processing subset (decision process block 413) the execution of the processor-executable program code by the processor may further cause the computing device 302 to execute the following: correcting the metadata (process block 415), generating a new processing subset (process block 416), where the data storage blocks are selected in the new processing subset according to the corrected metadata, executing the operation using another portion of the data stored in the new processing subset (repeating of the process block 412), and a couple of optional procedures including: uploading not yet uploaded portion of the data in the data buffer pool 303 from the data entities of a differential processing subset being a difference of the another processing subset generated in process block 416 and the processing subset generated in the process block 408, and repeating of merging of uploaded data entity fragments of the same data entity (repetition of the process block 411). The sequence of execution of the process blocks 415, 416, 417, 411, and 412 is depicted on the FIG. 5b.

The causes of the errors may be, for instance, updates of the data entities, which were not synchronized with corresponding updates of the metadata, erroneously generated metadata, etc. The metadata may be corrected automatically or an operator of the computing system is prompted to correct the metadata. A simple and reliable regime of correction of the metadata in automated mode is making the processing subset equal to the processing set. This step may be performed very fast and does not require any special algorithms for generation of the new metadata, which in their own turn may generate erroneous metadata. The restoring or reliable operation will be at expense of productivity of the computing system, because in this mode the only one option to execute the operation is to process the complete data. On the other hand, the operator of the computing system has enough time to analyze the root-cause of the error, correct the metadata and/or operations for generation of the metadata. The main advantage of this approach is that there is no need to halt the computing system for elimination of the root-cause of the error.

The computing device 302 may further include a query optimizer component (also referred to as "optimizer") 305. It may be implemented as a hardware unit included in the computing device 302 or as a software tire residing in the memory of the computing device 302. The query optimizer component (optimizer) 305 adapts/translates the received queries in query execution plans, which take into account metadata which is not addressed in the received queries. In particular the following may be executed by the query optimizer component 305: the determining that said data entity to be used for execution of said operation is stored across the data storage blocks, the generating of the processing subset, the generating of the metadata, and the correcting of the metadata.

The execution of the processor-executable program code by the processor may further cause the computing device 302 to upload in the data buffer pool 303 the data stored in the processing set. This process is represented by the process block 406. After execution of the process block 406 the execution of the processor-executable program code by the processor may further cause the computing device 302 to execute the process block 407.

The execution of the processor-executable program code by the processor may further cause the computing device 302 to send the result to a user 301 or another computer system from whom or from which the request message was received. This process is represented by the process block 409. This process block may be executed either after the process block 407 or after execution of the decision process block 418 if the result complies with the specification.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    storing data entities in data storage blocks, wherein the data storage blocks comprise a plurality of tables within a database in which the data entities are logically stored, a position of a data entity within a table of the plurality of tables is associated with a row and a column of the table, wherein the data storage blocks have physical addresses in a memory space of a storage device, and the data entities have logical addresses in the plurality of tables,
    wherein data entities having data entity volumes greater than a data storage volume of the data storage blocks are contiguously stored across the data storage blocks;
    mapping logical addresses associated with the data entities to physical addresses of the data storage blocks across which the data entities are stored;
    generating metadata associated with the data entities, the metadata identifying data entities required to execute an operation;
    based on the metadata, generating a processing set comprising only data storage blocks storing the data entities required to execute the operation;
    receiving a request message comprising an instruction to execute the operation;
    based on a logical address of at least one of the data entities required to execute the operation being mapped to two or more physical addresses associated with the data storage blocks comprised in the processing set, determining that the at least one of the data entities required to execute the operation is stored across the data storage blocks comprised in the processing set;
    generating a processing subset comprising only data storage blocks comprised in the processing set across which the at least one of the data entities required to execute the operation is stored, the processing set comprising the processing subset;
    executing the operation using a portion of data stored in the processing subset;
    uploading, in a data buffer pool, the portion of the data stored in the processing subset, wherein the portion of the data stored in the processing subset used for executing the operation is the uploaded portion of the data stored in the processing subset;
    merging data entity fragments of the at least one of the data entities required to execute the operation based on the uploaded portion of the data comprising more than one data entity fragments of the at least one of the data entities required to execute the operation; and
    based on a result of executing the operation using the portion of the data stored in the processing subset not meeting a specification,
    uploading in the data buffer pool a not yet uploaded portion of data stored in a different processing subset, the processing set being split in the processing subset and the different processing subset, wherein the data stored in the different processing subset is used for execution of the operation in the uploaded data, and
    continuing the merging data entity fragments of the at least one of the data entities required further based on the uploaded not yet uploaded portion of data stored in a different processing subset, wherein as a result thereof all of data entity fragments of the at least one of the data entities are merged in the data buffer pool.

2. The method of claim 1, further comprising:
    generating metadata linking operation parameters of the operation and data entity fragments of the at least one of the identified data entities, the operation parameters being specified in one or more request messages,
    wherein generating the processing subset comprises selecting the data storage blocks in the processing subset according to the metadata.

3. The method of claim 2, wherein the data entities comprising spatial data and having data entity volumes exceeding the data storage volume are stored across the data storage blocks in a way enabling generation of metadata, and wherein one or more operations are executed using only portions of the spatial data being the data entity fragments.

4. The method of claim 2, wherein the metadata is stored in a memory space of the storage device.

5. The method of claim 1, further comprising:
    executing the operation using data stored in the processing set in response to determining that the result of executing the operation using the portion of the data stored in the processing subset does not meet the specification.

6. The method of claim 5, wherein the specification comprises one or more request messages.

7. The method of claim 1, wherein the data buffer pool is allocated in a memory space of the storage device.

8. The method of claim 1, wherein the operation comprises standard query language queries and operation parameters of the operation comprise predicates of the queries.

9. The method of claim 1, further comprising:
    in response to determining a failure during execution of the operation using the portion of the data stored in the processing subset,
    correcting the metadata;
    generating a new processing subset, wherein data storage blocks for the new processing subset are selected according to the corrected metadata; and
    executing a new operation using a portion of data stored in the new processing subset.

10. The method of claim 1, wherein the data storage blocks are memory pages of a storage device.

11. The method of claim 10, further comprising: column storage sets, wherein column storage sets comprising more than one memory page are the column storage sets of contiguously allocated memory pages, the contiguously allocated memory pages being the memory pages contiguously allocated in a memory space of the storage device.

12. The method of claim 10, wherein the column storage sets, each comprising more than one memory page used for discrete storage of data entities, are the column storage sets of contiguously allocated memory pages, the contiguously allocated memory pages being memory pages contiguously allocated in the memory space of the storage device, wherein the column storage sets each comprising the memory pages across which the data entities are stored are the column storage sets consisting of column storage subsets, wherein the column storage subsets each comprising more than one memory page are the column storage subsets of the contiguously allocated memory pages, wherein the memory pages across which the data entities are stored are comprised in respective column storage subsets, wherein at least one storage subset of each column storage set consisting of the column storage subsets comprises fragments of each of the data entities stored in the respective column.

13. The method of claim 12, wherein the processing subset comprises column storage subsets containing data entity fragments of all data entities of the column comprising the data entity.

14. The method of claim 1, wherein the mapped logical addresses associated with the data entities are data is stored in the storage device.

15. The method of claim 1, wherein the data entities are allocated next to each other in a row of a table in the plurality of tables and, wherein data entities having an overall data volume less than or equal to the data storage volume are stored in a single data storage block.

16. The method of claim 1, wherein the database is a relational database.

17. A method comprising:
    storing data entities in data storage blocks corresponding to a column storage set of a table, the column storage set comprises a plurality of column storage subsets, each column storage subset comprises one or more data storage blocks, each data storage block has an associated data storage volume, and a position of a data entity within the table is associated with a row and a column of the table, the data storage blocks have physical addresses in a memory space of a storage device, and the data entities have logical addresses in the table,
    wherein data entities having an overall data entity volume greater than a data storage volume of a data storage block are distributed across one or more column storage subsets contiguously located;
    mapping logical addresses associated with the data entities distributed across the one or more column storage subsets to physical addresses of the data storage blocks across which the data entities are stored;
    generating metadata associated with the data entities distributed across the one or more column storage subsets, the metadata linking operation parameters of an operation and data storage blocks storing data entity fragments of data entities within the data entities distributed across the one or more column storage subsets required to execute the operation;
    based on the metadata, generating a processing set comprising only data storage blocks storing the data entity fragments required to execute the operation;
    receiving a request message comprising an instruction to execute the operation, the request comprising a specification of an error margin within which a result of executing the operation can be achieved;
    based on a logical address of at least one data entity required to execute the operation being mapped to two or more physical addresses of the data storage blocks within the processing set, determining that data entity fragments of the at least one data entity are stored across the data storage blocks within the processing set;
    generating a processing subset in response to determining that the data entity fragments of the at least one data entity are stored across the data storage blocks within the processing set, the processing subset comprising only data storage blocks across which the data entity fragments of the at least one data entity are stored, the processing set comprising the processing subset;
    uploading, in a data buffer pool allocated in a memory space of a storage device, the data entity fragments of the at least one data entity required to execute the operation;
    merging, in the data buffer pool, the data entity fragments of the at least one data entity;
    executing the operation using the uploaded data entity fragments of the at least one data entity;
    in response to the result of executing the operation using the uploaded data entity fragments does not meet the specification, correcting the metadata, wherein the corrected metadata is generated by making the processing subset equal to the processing set; and
    based on the corrected metadata, generating a new processing subset.

18. The method of claim 17, wherein determining that data entity fragments of the at least one data entity are stored across the data storage blocks further comprises:
    executing a prefetching operation to count a number of data storage blocks in which the data entity fragments of the at least one data entity are stored.

* * * * *